(12) United States Patent
Kim et al.

(10) Patent No.: US 10,372,159 B2
(45) Date of Patent: Aug. 6, 2019

(54) ATTACHABLE/DETACHABLE ELECTRONIC DEVICE

(71) Applicant: Samsung Electronics Co., Ltd., Gyeonggi-do (KR)

(72) Inventors: Hae-Soo Kim, Gyeonggi-do (KR); Dong-Yun Lee, Gyeonggi-do (KR); Woo-Jung Shim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 30 days.

(21) Appl. No.: 15/273,018

(22) Filed: Sep. 22, 2016

(65) Prior Publication Data

US 2017/0083049 A1    Mar. 23, 2017

(30) Foreign Application Priority Data

Sep. 22, 2015  (KR) .................. 10-2015-0133553
May 30, 2016   (KR) .................. 10-2016-0066487

(51) Int. Cl.
 *G06F 1/16* (2006.01)

(52) U.S. Cl.
 CPC .......... *G06F 1/1626* (2013.01); *G06F 1/1632* (2013.01); *G06F 1/1656* (2013.01)

(58) Field of Classification Search
 CPC ..... G06F 1/1626; G06F 1/1632; G06F 1/1656
 See application file for complete search history.

(56) References Cited

U.S. PATENT DOCUMENTS

| | | | |
|---|---|---|---|
| 8,599,542 B1* | 12/2013 | Healey | G06F 1/1626 345/168 |
| 8,934,219 B2 | 1/2015 | Gartrell et al. | |
| 9,541,954 B1* | 1/2017 | Lee | G06F 1/1618 |
| 2004/0190239 A1* | 9/2004 | Weng | G06F 1/1616 361/679.2 |
| 2009/0103261 A1 | 4/2009 | Shih | |
| 2013/0170126 A1 | 7/2013 | Lee | |
| 2013/0178155 A1 | 7/2013 | Shulenberger | |

FOREIGN PATENT DOCUMENTS

WO    WO 2015/047361    4/2015

OTHER PUBLICATIONS

International Search Report dated Nov. 28, 2016 issued in counterpart application No. PCT/KR2016/009887, 10 pages.

* cited by examiner

*Primary Examiner* — James Wu
(74) *Attorney, Agent, or Firm* — The Farrell Law Firm, P.C.

(57) ABSTRACT

An electronic device is provided, which uses magnetic force to couple to an external device. The electronic device includes a housing, a magnet positioned within the housing, and an elastic body connected to the magnet. At least a portion of the elastic body changes a shape or a position thereof, in response to a change of a magnetic force of the magnet.

20 Claims, 11 Drawing Sheets

ATTACHABLE/DETACHABLE ELECTRONIC DEVICE

PRIORITY

This application claims priority under 35 U.S.C. § 119(a) to Korean Application Serial Nos. 10-2015-0133553 and 10-2016-0066487, which were filed in the Korean Intellectual Property Office on Sep. 22, 2015 and May 30, 2016, respectively, the entire content of each of which is hereby incorporated by reference.

BACKGROUND

1. Field of the Disclosure

The present disclosure relates generally to an electronic device, and more particularly, to an attachable/detachable electronic device.

2. Description of the Related Art

While various functions have been incorporated in an electronic device, such as a smart phone or a tablet personal computer (PC), convenience of use may still be somewhat unsatisfactory because such an electronic device has a structure that was designed mostly in consideration of portability. For example, the size or volume to be output may be limited, and inputting various information may be inconvenient. Accordingly, various types of external devices that are interlockable with such an electronic device (e.g., a docking station) have been proposed for expanding of the functionality of the electronic device (e.g., a function of an input/output device).

External devices that are interlockable with an electronic device may provide a charge function when the electronic device is cradled thereon, may be equipped with a separate speaker phone for outputting sound, or may be equipped with a keyboard in for providing an input device function. Accordingly, an external device, which is interlockable with the electronic device, may expand the functionality of the electronic device and/or may improve convenience in using the electronic device.

However, while the convenience and functionality of using an electronic device may be improved by expanding the functions of the electronic device by using an external device (e.g., a docking station) that is interlockable with the electronic device, it may still be inconvenient to carry the external device separately from the electronic device.

SUMMARY

Accordingly, an aspect of the present disclosure is to provide an electronic device that easily couples to an external device, which may be conveniently carried (for example, by being coupled to the electronic device).

Another aspect of the present disclosure is to provide an electronic device that can stably maintain a coupled state between the electronic device and an external device in order to carry the external device.

Another aspect of the present disclosure is to provide an external device that is conveniently carried while being coupled to an electronic device.

In accordance with an aspect of the present disclosure, a portable electronic device is provided, which includes a housing, a magnet positioned within the housing, and an elastic body connected to the magnet. At least a portion of the elastic body changes a shape or a position thereof, in response to a change of a magnetic force of the magnet.

In accordance with another aspect of the present disclosure, a portable electronic device is provided, which includes a housing, a magnet positioned within the housing, and an elastic body connected to the magnet. At least a portion of the elastic body is moveable from a first position corresponding to a first face of the housing to a second position corresponding to a second face of the housing, in response to a change of a magnetic force of the magnet.

In accordance with another aspect of the present disclosure, a portable electronic device is provided, which includes a housing, a magnet positioned within the housing, and an elastic body connected to the magnet. At least a portion of the elastic body is moveable to be spaced apart from one face of the housing, in response to a change of a magnetic force of the magnet.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
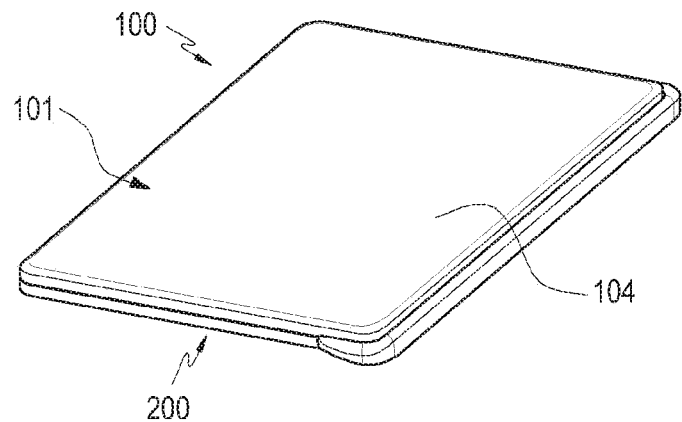
FIG. 1 illustrates an electronic device coupled to an external device according to an embodiment of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure.

In describing the drawings, similar reference numerals may be used to designate similar constituent elements.

Herein, terms used to describe specific embodiments are not intended to limit the present disclosure. Singular forms are intended to also include the plural forms, unless the context clearly indicates otherwise.

The terms "include" and "have" indicate the existence of a feature, a number, a step, an operation, a structural element, parts, or a combination thereof, and do not exclude the existences or probability of an addition of one or more other features, numeral, steps, operations, structural elements, parts, or combinations thereof.

Unless defined differently, all of the terms used herein, which include technical terminologies or scientific terminologies, have the same meanings as understood by a person skilled in the art to which the present disclosure belongs. Terms defined in a generally used dictionary are to be interpreted to have the same meanings as the contextual meanings in the relevant field of art, and are not to be interpreted to have ideal or excessively formal meanings unless clearly defined as such in the present specification. In some cases, even a term defined in the present disclosure should not be interpreted to exclude embodiments of the present disclosure.

Herein, the expressions "A or B", "at least one of A or/and B", and "one or more of A or/and B" may include all possible combinations of the items listed. For example, the expression "A or B", "at least one of A and B", and "at least one of A or B" refer to (1) including at least one A, (2) including at least one B, or (3) including all of at least one A and at least one B.

Expressions such as "a first", "a second", "the first", and "the second" may modify various components regardless of order and/or importance, but do not limit the corresponding components. For example, a first user device and a second user device indicate different user devices although both items are user devices. For example, a first element may be referred to as a second element, and similarly, a second element may be referred to as a first element without departing from the scope of the present disclosure.

When one element (e.g., a first element) is described as being "(operatively or communicatively) coupled with/to or connected to" another element (e.g., a second element), the first element may be directly connected to the second element or the first element may be indirectly connected to the second element via yet another element (e.g., a third element). However, when the first element is described as being "directly connected," or "directly coupled" to the second element, there are no intervening elements therebetween.

The term "configured to" may be alternated with, for example, "suitable for", "having the capacity to", "designed to", "adapted to", "made to", or "capable of". The term "configured to" may not necessarily imply "specifically designed to" in hardware.

Alternatively, the expression "device configured to" may indicate that the device, together with other devices or components, "is able to". For example, the phrase "a processor adapted (or configured) to perform A, B, and C" may indicate a dedicated processor (e.g., embedded processor) only for performing A, B, and C or a generic-purpose processor (e.g., central processing unit (CPU) or application processor (AP)) that can perform A, B, and C by executing one or more software programs, e.g., stored in a memory device.

Herein, an electronic device may be a terminal, a portable terminal, a mobile terminal, a communication terminal, a portable communication terminal, a portable mobile terminal, a display device or the like.

For example, the electronic device may be a smartphone, a portable phone, a game player, a television (TV), a navigation device, a heads-up display unit for a vehicle, a notebook computer, a laptop computer, a tablet PC, a personal media player (PMP), a personal digital assistants (PDA), a mobile medical device, a camera, a wearable device (e.g., smart eyeglasses, an electronic bracelet, an electronic appcessory, an electronic necklace, a smart mirror, or a smart watch), etc. The electronic device may be implemented as a pocket sized portable communication terminal having a wireless communication function.

Further, the electronic device may be a flexible device or a flexible display device.

The electronic device may communicate with an external electronic device, such as a server or the like, and/or perform an operation through an interworking with the external electronic device. For example, the electronic device may transmit an image photographed by a camera and/or position information detected by a sensor unit to the server through a network. The network may be a mobile or cellular communication network, a local area network (LAN), a wireless local area network (WLAN), a wide area network (WAN), an Internet, a small area network (SAN), etc., but is not limited thereto.

Figure 2:
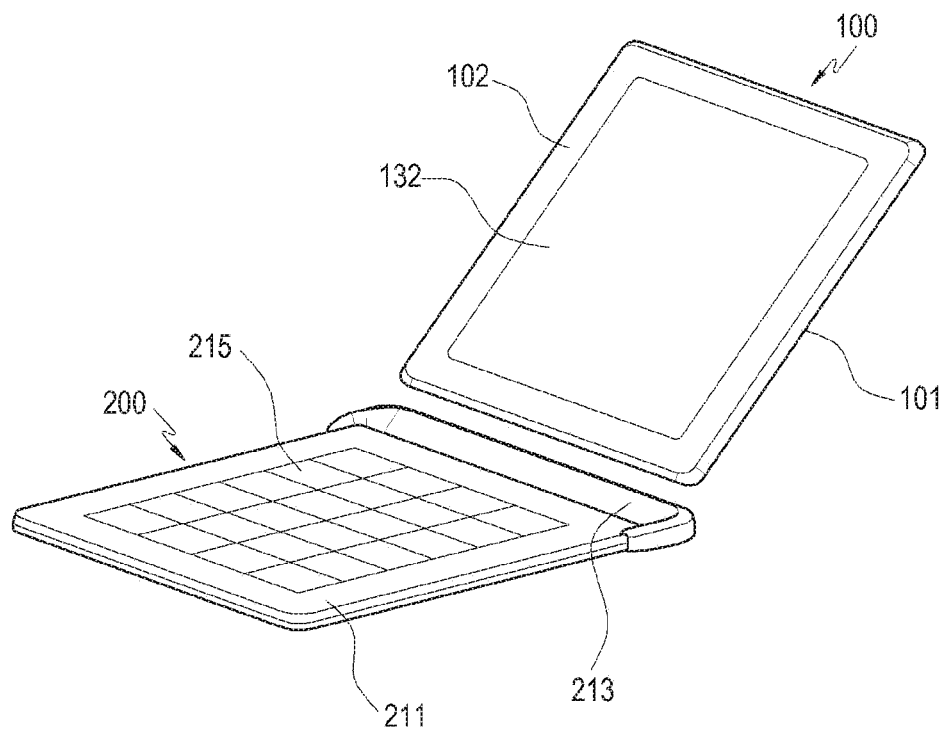
FIG. 2 illustrates an electronic device separated from an external device according to an embodiment of the present disclosure.
Figure 3:
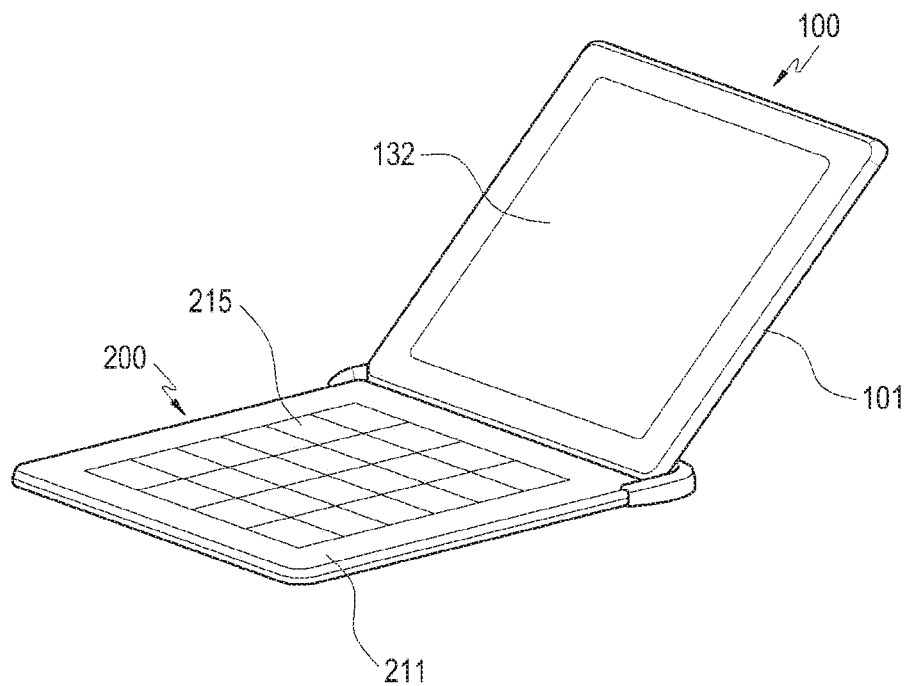
FIG. 3 illustrates an electronic device cradled on an external device according to an embodiment of the present disclosure.
Figure 4:
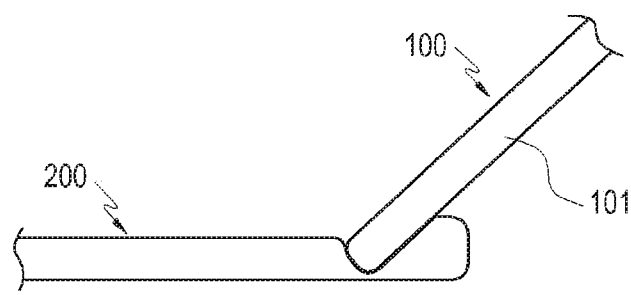
FIG. 4 illustrates an electronic device cradled on an external device according to an embodiment of the present disclosure.

FIG. 1 illustrates an electronic device coupled to an external device according to an embodiment of the present disclosure; FIG. 2 illustrates an electronic device separated from an external device according to an embodiment of the present disclosure; FIG. 3 illustrates an electronic device cradled on an external device according to an embodiment of the present disclosure; and FIG. 4 illustrates an electronic device cradled on an external device according to an embodiment of the present disclosure.

Referring to FIGS. 1 to 4, an electronic device 100 includes a housing 101, which includes a front cover 102 and a rear cover 104. The front cover 102 and the rear cover 104 may be integrally formed with each other or may be formed in a separated form. The front cover 102 is mounted on a front face of a bar-type or a plate-type housing 101. Thus, the front face of the housing 101 may be closed due to the front cover 102. The front cover 102 includes a display 132, which may output visual information, such as an image or a text, through a screen area. The front cover 102 may include a touch panel for receiving a user input. Although FIGS. 1-4 illustrate the display 132 on the front cover 102 of the electronic device 100, a display may also or alternatively being included on the rear cover 104 of the electronic device 100.

The electronic device 100 may implement various functions by including various input/output devices and sensors, such as a power button, a volume control button, a speaker module, a microphone module, a camera module, an optical proximity sensor, and a gyro sensor.

A user may perform, through the electronic device 100, storage or input/output of various information or information retrieval by connecting to a network.

The electronic device 100 may be coupled to the external device 200, and have an appearance similar to a laptop computer in a coupled state.

The external device 200 includes a mounting recess 213 formed on a face 211 of the external device 200. The mounting recess 213 is positioned at a side edge of the face 211.

Referring to FIG. 3 and FIG. 4, at least a portion of the electronic device 100 is inserted into, or fastened to, the mounting recess 213, such that the electronic device 100 is cradled on the external device 200 in an inclined state.

Referring to FIG. 1, the electronic device 100 is coupled to the external device 200 on the face 211 of the external device 200, such that the front cover 102 of the electronic device 100 faces the face 211 of the external device 200.

The external device 200 includes a keyboard 215 disposed on the face 211. For example, the input device of the electronic device 100 may be expanded by coupling the electronic device 100 to the external device 200.

The mounting recess 213 is positioned at a side of the keyboard 215.

While various embodiments of the present disclosure herein are described with reference to an example in which the external device 200 is provided with a keyboard 215, the external device 200 may also or alternatively include, for example, a touch pad, a speaker module, a storage medium, and/or a communication module. Accordingly, it is possible to improve the performance of the electronic device 100 or to expand the functionality of the electronic device 100.

As illustrated in FIGS. 3 and 4, when the electronic device 100 is cradled on the external device 200 (e.g., to be inclined), the electronic device 100 and the external device 200 have an appearance similar to that of an unfolded laptop computer. Accordingly, the electronic device 100 may provide various functions, and may be utilized similarly to a laptop computer by being combined with the external device 200.

The electronic device 100 and the external device 200 may include a fixing device for stably maintaining the coupled state. For example, the fixing device may be formed as a mechanical fastening structure, such as a hook and a hook, or a hook and a recess.

The electronic device 100 and the external device 200 may also include a fixing device in which a magnet is used to stably fix the electronic device 100 to the external device 200 without deteriorating the appearance thereof.

Figure 5:
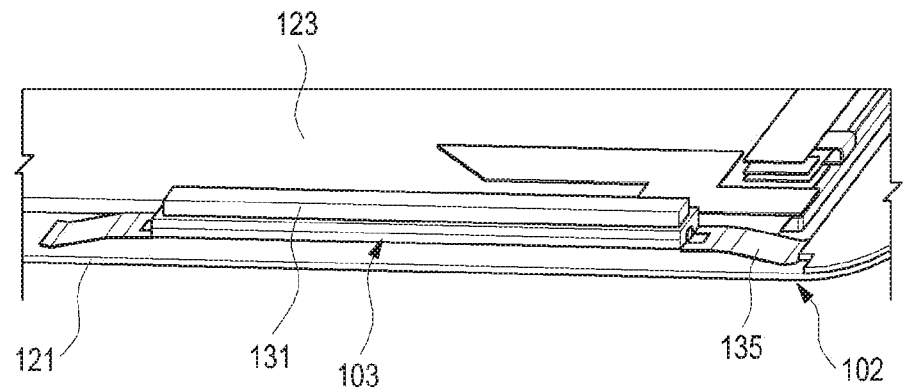
FIG. 5 illustrates an enlarged portion of a front cover of an electronic device according to an embodiment of the present disclosure.

FIG. 5 illustrates an enlarged portion of an electronic device according to an embodiment of the present disclosure.

Referring to FIG. 5, the front cover 102 of the housing 101 includes a window 121, the display 123, and a magnet 131. The window 121 is mounted on the front cover 102 of the housing 101, and may be manufactured from a transparent material that allows light to penetrate therethrough. The display 123 is disposed on the inner face of the front cover 102 (e.g., the inner face of the window member 121). The display may output a screen (e.g., contents, an image, a video image, and/or a text).

The magnet 131 is disposed at a side edge of the front cover 102 (on the inner face of the window member 121, at a side of the display 123).

The electronic device 100 also includes an elastic body 135. The magnet 131 is arranged or mounted on the elastic body 135 to form a magnetic module 103.

Further, a magnetic module, which is similar to, or the same as, the magnetic module 103, i.e., a second magnetic module, may be disposed inside the external device 200. The polarities of the magnetic module 103 and the second magnetic module may be different from (opposite to) each other.

For example, the magnetic module 103 (e.g., a magnet having a first polarity (e.g., S-pole)) may be disposed in the electronic device 100, and the second magnetic module (e.g., a magnet having a second polarity (e.g., N-pole)) may be disposed in the external device 200. The magnetic module 103 may have a shape that is the same as, or similar to, the second magnetic module.

Figure 6:
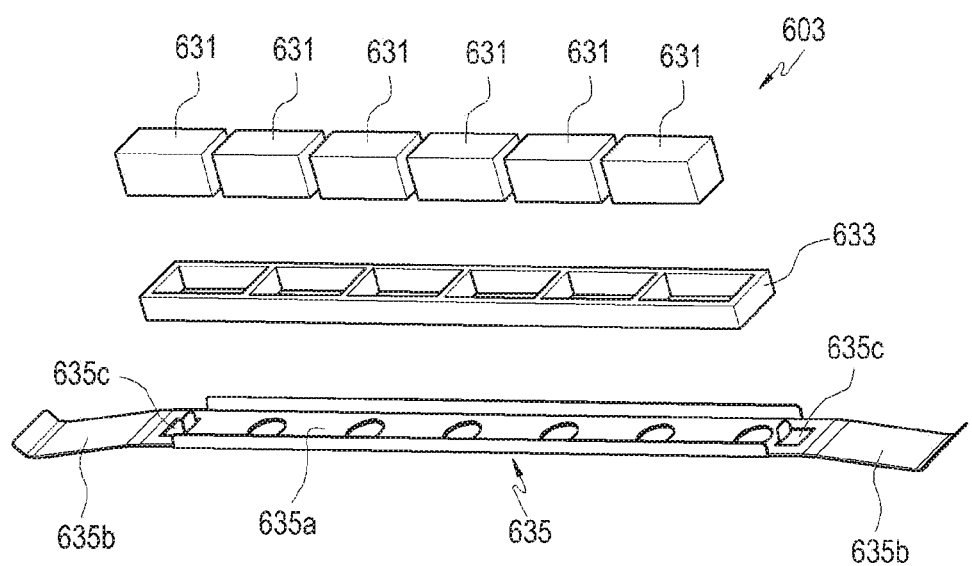
FIG. 6 illustrates a magnetic module of an electronic device in a disassembled state according to an embodiment of the present disclosure.
Figure 7:
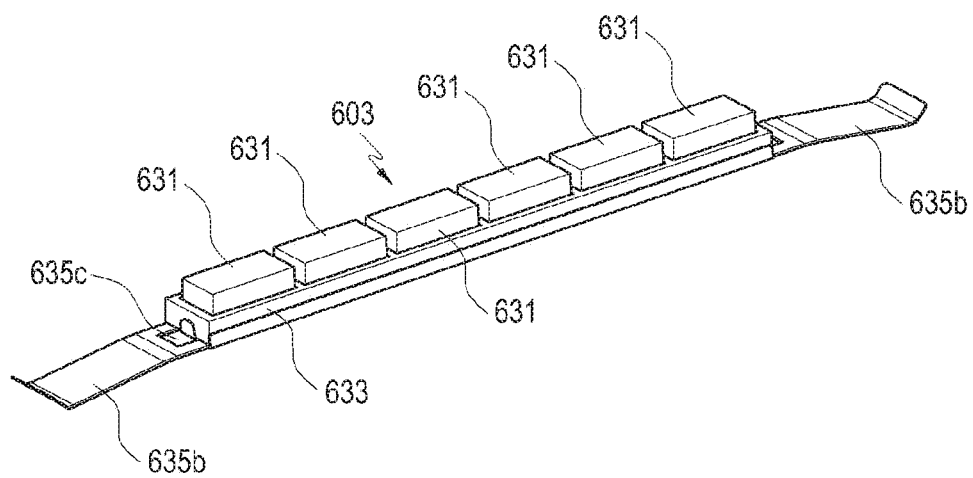
FIG. 7 illustrates a magnetic module of an electronic device in an assembled state according to an embodiment of the present disclosure.

FIG. 6 illustrates a magnetic module of an electronic device in a disassembled state according to an embodiment of the present disclosure, and FIG. 7 illustrates the magnetic module of the electronic device in an assembled state according to an embodiment of the present disclosure. For example, a magnetic module 603, as illustrated in FIGS. 6 and 7, may be substituted for the magnetic module 103 in FIG. 5 and/or in the external device 200.

Referring to FIGS. 6 and 7, the magnetic module 603 includes magnets 631 and an elastic body 635. The magnetic module 603 further includes a holder 633, which may be made of a material that is different from that of the elastic body 635.

The magnets 631 are arranged along the elastic body 635. The magnets 631 generate an attractive force (or a repulsive force) with an external object (e.g., an object that is capable of having a magnetic force). For example, the coupled state of the electronic device 100 to the external object can be maintained through an attractive force generated between the magnets 631 and the external object (e.g., the above-mentioned external device 200).

The holder 633 may fix the magnets 631 in a predetermined arrangement to the elastic body 635. The holder 133 includes recesses corresponding to the magnets 631, respectively. The magnets 631 may be mounted on the elastic body 635 while being individually fixed to the holder 633.

Alternatively, the holder 633 may be integrally formed with the magnets 631 and/or the elastic body 635, for example, through an insert injection molding method.

Alternative, the magnets 631 themselves may be directly mounted on, or fixed to, the elastic body 635, without using the holder 633.

The elastic body 635 includes a fixing part 635a, and elastic parts 635b that are inclined from opposite ends of the fixing part 635a. For example, the elastic body 635 may be made through sheet metal working of a metal plate. The central portion of the elastic body 635 may be formed as a fixing part 635a that is substantially parallel to the front cover 102. The opposite end portions of the elastic body 635 may be formed as elastic parts 635b that are formed to be inclined with respect to the fixing part 635a. The fixing part 635a may provide a space (or a surface) to accommodate or mount the magnets 631 and/or the holder 633 to which the magnets 631 are fixed.

Openings 635c are formed in the opposite ends of the fixing part 635a, respectively, e.g., by partially cutting the fixing part 635a and bending the cut portions. The elastic force provided by the elastic part 635b may vary depending on the size of the openings 635c and the bend angle and direction of the cut portions.

Assuming that the surface, on which the magnets 631 are arranged, is a top surface of the elastic body 635, the elastic parts 635b are formed to be inclined downwardly with respect to the elastic body 635.

Figure 8:
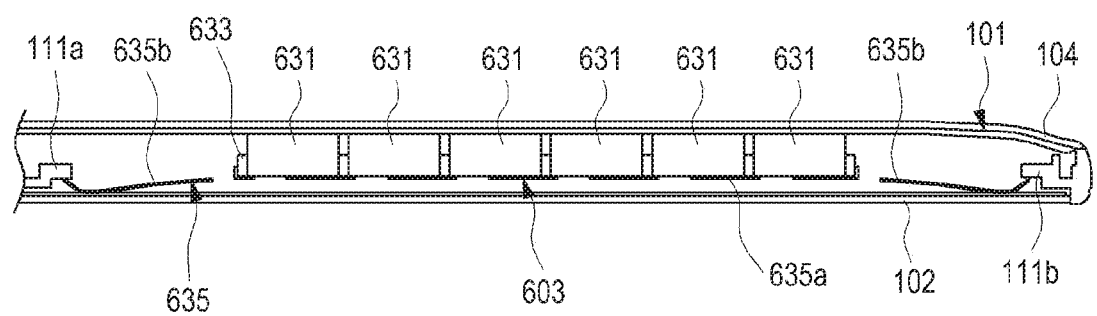
FIG. 8 illustrates a magnetic module mounted in an electronic device according to an embodiment of the present disclosure.

FIG. 8 illustrates a magnetic module mounted on an electronic device according to an embodiment of the present disclosure.

Referring to FIG. 8, the magnetic module 603 is fixed to the housing 101 (e.g., the inner face of the front cover 102). Support protrusions 111a and 111b are formed on the inner wall of the housing 101. The support protrusions 111a and 111b extend in parallel to the inner face of the front cover 102 from the inner wall of the rear cover 104 of the housing 101. For example, when the front cover 102 is coupled to the housing 101, the first support protrusion 111a and the second protrusion 111b are disposed on the inner face of the front cover 102 to face each other.

The elastic body 635 is fixed to the inner face of the front cover 102, where the both end portions of the elastic body 635b are interposed between the inner face of the front cover 102 and the support protrusions 111a and 111b. For example, when the elastic body 635 is fixed to the inside of the front cover 102, the elastic part 635b may provide an elastic force that acts in a direction of causing the fixing part 635a to be spaced apart from the inner face of the front cover 102. However, when no external force is applied, the magnets 631 remain spaced apart from the inner face of the front cover 102. Accordingly, the elastic body 635 may provide an elastic force that maintains the magnets 631 at a first position corresponding to the rear face of the housing 101 and/or at a second position spaced apart from the front face of the housing 101.

When an external force (e.g., an attractive force) acts on the elastic body 635 and/or the magnets 631 arranged on the elastic body 635, the fixing part 635a (e.g., the magnets 631) may be in close contact with the inner face of the front cover 102. For example, when a magnetizable external object is positioned on the front cover 102 adjacent to the magnets 631, the fixing part 635a may come in close contact with the inner face of the window member 121 by the attractive force of the magnets 631 to the external object. For example, as the peripheral magnetic force environment is changed, the elastic body 635 changes in shape or position so as to move the magnets 631 to the second position corresponding to the front face of the housing 101. For example, the magnets 631 may receive the elastic force of the elastic body 635 to remain at a predetermined position, and may be moved between the first position and the second position based on the change of the magnetic force.

The magnetic force, which changes the position of the magnets 631, may be generated by a magnetizable external object or an external device including another magnet (e.g., the external device 200). The housing 101 may be coupled to, and mounted on, the external device 200 by the magnetic force acting between the magnets 631 and the magnets of the external device 200.

It is possible that a magnetic field generated by the magnets 631 may damage some of the user's belongings. For example, the information stored on a magnetic strip of a credit card may be damaged by the magnetic field of the magnets 631. Accordingly, the electronic device 100 may control the magnets 631 to be spaced apart from the inner face of the front cover 102 by using the elastic body 635 in order to suppress the magnetic field generated by the magnets 631 from having an effect on the external environment of the electronic device 100.

As described above, a magnetic module, which is the same as or similar to the above-mentioned magnetic modules 103 and 603, may also be included in the external device 200. For example, the electronic device 100 and the external device 200 may be provided with the magnetic module (e.g., first magnetic module) 103 and a second magnetic module, respectively, and when the electronic device 100 is coupled to face the external device 200, the electronic device 100 may be rigidly coupled or fixed to the external device 200 by the attractive force generated between the first magnetic module 103 and the second magnetic module.

According to an embodiment of the present application, the electronic device 100 or the second magnetic module disposed in the external device 200 do not necessarily have to include the magnets. For example, a flat plate made of a magnetizable material may be installed at a corresponding position of the electronic device 100 or the external device 200 so as to generate an attractive force to the first magnetic module 103.

Figure 9:
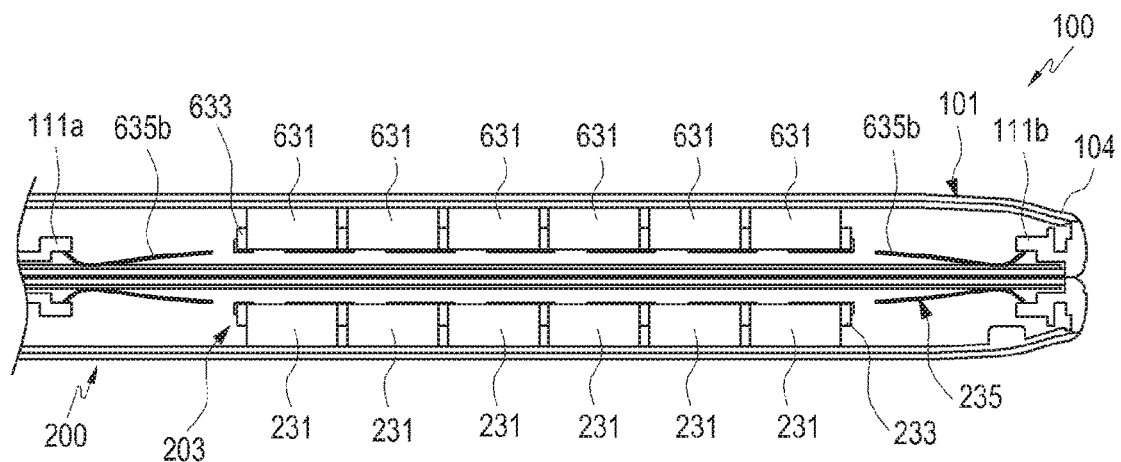
FIGS. 9 and 10 illustrate an operation of coupling an electronic device to an external device according to an embodiment of the present disclosure.
Figure 10:
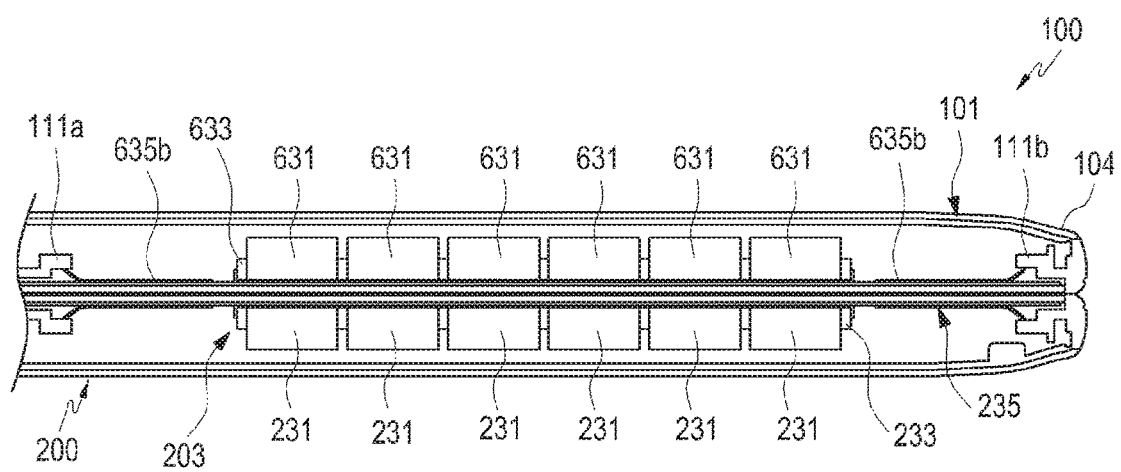

FIGS. 9 and 10 illustrate an operation of coupling an electronic device to an external device according to an embodiment of the present disclosure. For example, FIGS. 9 and 10 illustrate the electronic device 100 including the magnetic module 603 as illustrated in FIGS. 6 and 7 and the external device 200 including a magnetic module 203 having the same structure as the magnetic module 603.

Referring to FIGS. 9 and 10, the external device 200 (e.g., a speaker device, a display device, a touch pad device, a keyboard device, a docking station, etc.) includes a second magnetic module 203. The second magnetic module 203 includes second magnets 231 and a second elastic body 235. The external device 200 further includes a holder (e.g., a second holder) 233 for mounting the second magnetic module 203 on the second elastic body 235. The second holder 233 may be mounted on the second elastic body 235 such that the second magnets 231 are fixed in a predetermined arrangement. The second elastic body 235 may include a second fixing part and second elastic parts, like the elastic body 635. The second elastic part may be fixed to the inner face of the external device 200 in order to space the second fixing part from the inner face of the external device 200. For example, in when no external force acts, the second fixing part (e.g., the second magnets 231) may be spaced apart from the inner face of the external device 200 by the elastic force provided by the second elastic part 235.

The above-described second magnetic module 203 may be implemented to be similar to, or the same as, the above-described magnetic module 603. For example, in the state where no external force acts, the second elastic body 235 may provide the elastic force so that the second magnets 231 remain spaced apart from the inner face (or inner wall) of the external device 200. For example, each of the magnets 631 and 231 of the magnetic module 603 and the second magnetic module 203 is movable within the electronic device 100 and the external device 200.

Before an external force acts, the magnetic module 603 and the second magnetic module 203 may maintain the magnets 631 apart from the inner face of the front cover 102 and the magnets 231 apart from the inner face of the external device 200, as illustrated in FIG. 9.

The magnets 631 and the second magnets 231 may be arranged to generate an attractive force in relation to each other. For example, when the electronic device 100 is coupled to and facing the external device 200, an attractive force may be generated between the magnets 631 and the second magnets 231. By the attractive force generated between the magnets 631 and the second magnets 231, the magnets 631 (e.g., the fixing part 635a of the elastic body 635) may come in close contact with the inner face of the front cover 102, and the second magnets 231 (e.g., at least a portion of the second elastic body 235) may come in close contact with the inner face of the external device 200, as illustrated in FIG. 10.

As the magnets 631 and the second magnets 231 come closer contact with the inner faces of the front cover 102 and the external device 200, the spacing between the magnets 631 and the second magnets 231 reduces, and the attractive force generated between the magnets 631 and the second magnets 231 increases. For example, by the attractive force between the magnets 631 and the second magnets 231, the electronic device 100 may be stably coupled and fixed to the external device 200.

When the electronic device 100 is coupled to the external device 200, the coupling remains fixed by the attractive force of the magnets 631 and 231.

By forming a fixing device using magnets, because it is not necessary to form an external mechanical structure for fixing the electronic device (e.g., a hook or a recess), it is possible to make the appearance of the electronic device 100 or the external device 200 more pleasing. Further, because an elastic body including the elastic part is used in installing the magnets, it is also possible to suppress the magnetic force of the magnets from having an influence on the external environment.

Figure 11:
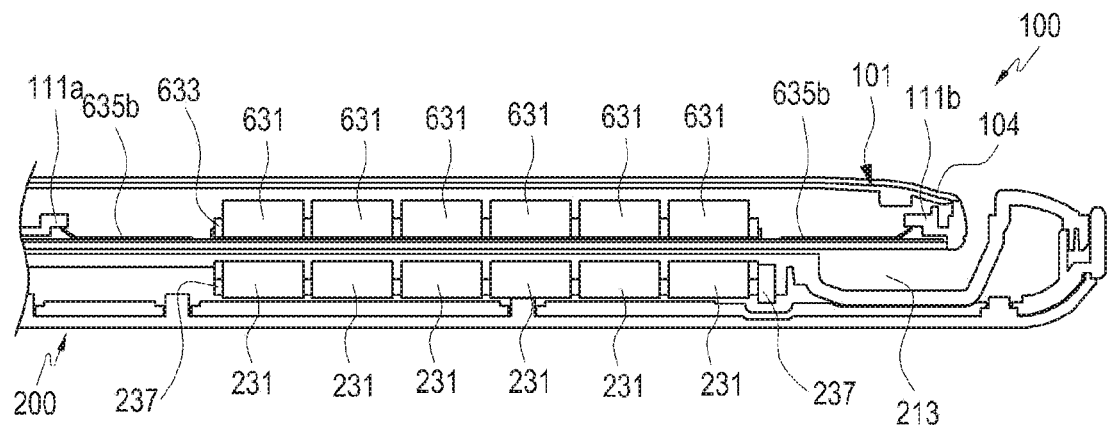
FIG. 11 illustrates an electronic device coupled to an external device according to an embodiment of the present disclosure.

FIG. 11 illustrates an electronic device coupled to an external device according to an embodiment of the present disclosure.

Referring to FIG. 11, the second magnets 231 disposed in the external device 200 are directly fixed to the inner face of the external device 200. For example, FIGS. 9 and 10 illustrate a configuration in which the second magnets 231 are installed inside the external device 200 through the second elastic body 235. However, as illustrated in FIG. 11, the second magnets 231 may be fixed to the inner face of the external device 200.

The external device 200 includes a second holder 237 for arranging and fixing the second magnets 231 such that the second magnets 231 can be rigidly fixed to the external device 200.

Because the magnets 631 and/or the second magnets 231 generate an attractive force in relation to each other, it is possible to prevent the electronic device 100 from being released from the external device 200 (e.g., in the upward direction illustrated in FIG. 9). For example, the magnets 631 and/or the second magnets 231 may stably fix the electronic device 100 to the external device 200. Further, it is possible to suppress the electronic device 100 from moving in a horizontal direction (e.g., in the left and right directions illustrated in FIG. 9) with respect to the external device 200 by using an arrangement of the magnets 631 and/or the second magnets 231.

Figure 12:
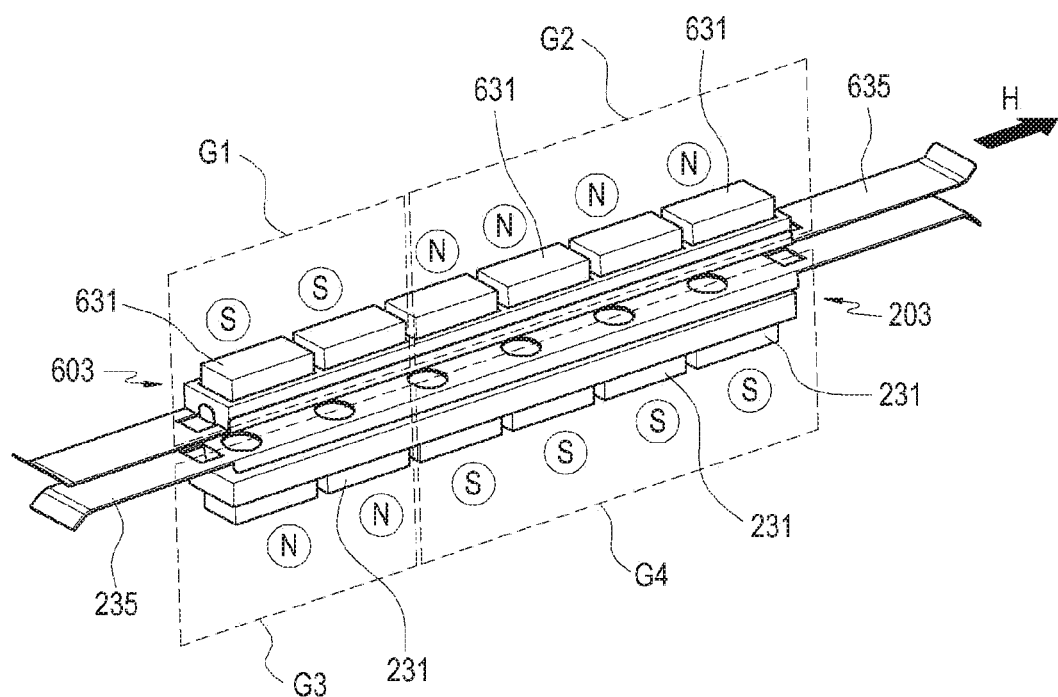
FIG. 12 illustrates magnetic modules, which are mounted on an electronic device and an external device, respectively, according to an embodiment of the present disclosure.
Figure 13:
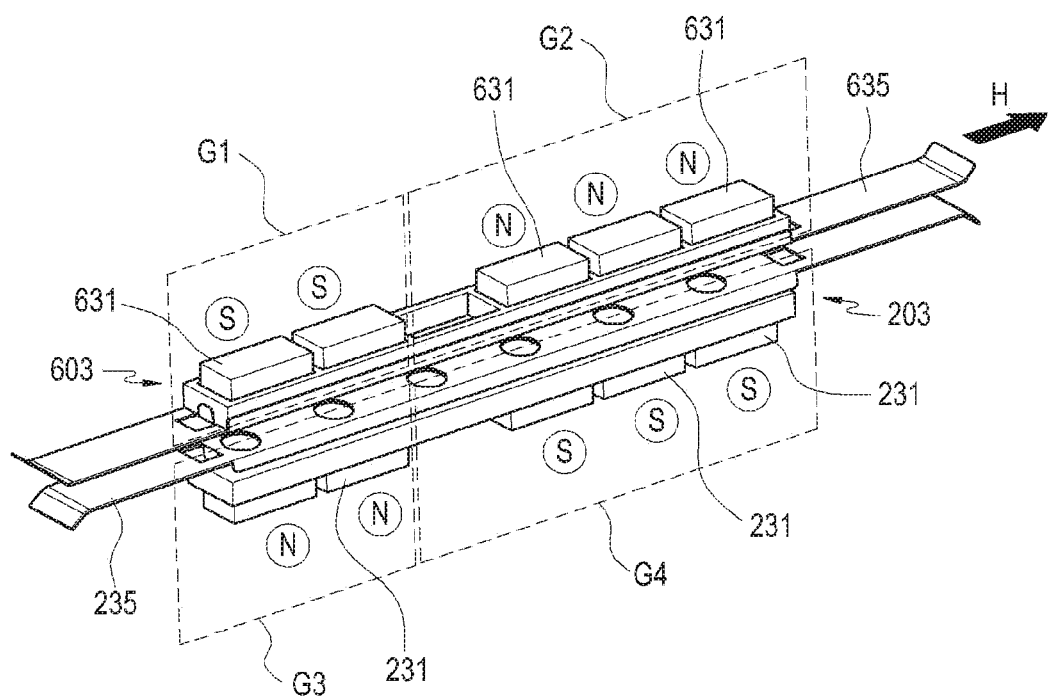
FIG. 13 illustrates magnetic modules, which are mounted on an electronic device and an external device, respectively, according to an embodiment of the present disclosure.
Figure 14:
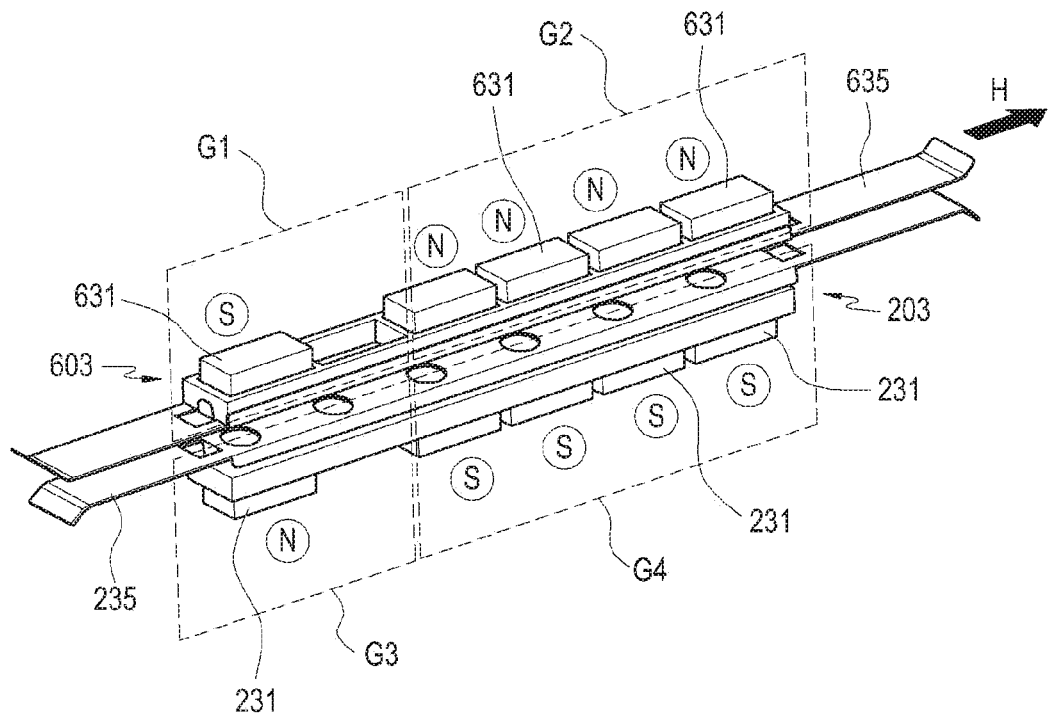
FIG. 14 illustrates magnetic modules, which are mounted on an electronic device and an external device, respectively, according to an embodiment of the present disclosure.

FIGS. 12 to 14 illustrate magnetic modules, which are mounted on an electronic device and an external device, respectively, according to various embodiments of the present disclosure.

Referring to FIGS. 12 to 14, the magnets 631 are arranged on the elastic body 635 (e.g., on the above-described fixing part 635a), and may be divided into a group of magnets in which a first polarity (e.g., S-pole) is disposed to face the inner face of the front cover 102 (hereinafter, referred to as a "first group G1") and a group of magnets in which a second polarity (e.g., N-pole) is disposed to face the inner face of the front cover 102 (hereinafter, referred to as a "second group G2").

On the second elastic body 235, the second magnets 231 may form a third group G3 in which a polarity (e.g., N-pole) is disposed to generate an attractive force with the magnets of the first group G1, and a fourth group in which a polarity (e.g., S-pole) is disposed to generate an attractive force with the magnets of the second group G2. When each of the magnetic modules 603 and 203 includes a plurality of magnets, the magnets disposed in each of the elastic bodies 635 and 235 may be disposed to be spaced apart from each other by a predetermined distance.

For example, when the electronic device 100 is coupled to and facing the external device 200, the magnets of the first group G1 may be disposed to face the magnets of the third group G3, respectively, and the magnets of the second group G2 may be disposed to face the magnets of the fourth group G4, respectively. The attractive force generated between the magnets 631 and the second magnets 231 may stably couple and fix the electronic device 100 to the external device 200.

A repulsive force may also act between the magnets of the first group G1 and the fourth group G4 and/or between the magnets of the second group G2 and the third group G3. The above-described arrangement of the magnets 631 and/or the second magnets 231 is able to suppress the electronic device 100 from moving in the horizontal direction with respect to the external device 200. For example, when the electronic device 100 moves in a first horizontal direction H, a repulsive force generated between the magnets of the first and fourth groups G1 and G4 may suppress the movement of the electronic device 100. When the electronic device 100 moves in an inverse direction to the first horizontal direction H, a repulsive force generated between the magnets of the second and third groups G2 and G3 may similarly suppress the movement of the electronic device 100.

Figure 15:
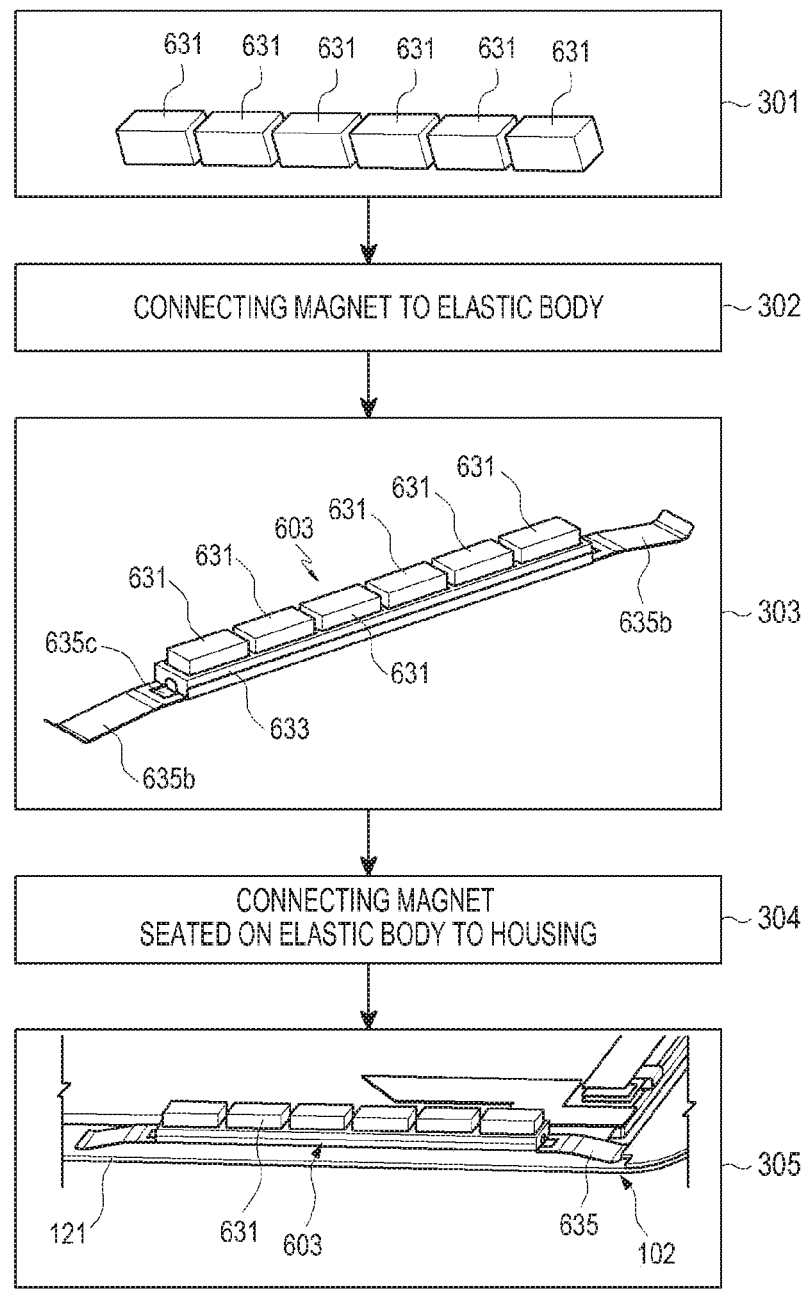
FIG. 15 illustrates an operation of disposing magnets of an electronic device and/or an external device according to an embodiment of the present disclosure.

FIG. 15 illustrates an operation of disposing magnets in an electronic device and/or an external device according to an embodiment of the present disclosure. For example, the operation of FIG. 15 will be described with reference to the magnetic module 603 as described above.

Referring to FIG. 15, in step 301, the magnets 631 are aligned, e.g., in the above-described holder 633.

In step 302, the aligned magnets 631 are connected to the elastic body 635. For example, the magnets 631 may be directly seated on and fixed to the elastic body 635, or may be seated on and fixed to the elastic body 635 through the holder 633.

In step 303, the elastic body 635 is bent to come in close contact with the magnets 631 and/or the holder 633. The fixed state of the magnets 631 and/or the holder 633 can be more strengthened.

In step 304, the magnets 631 are connected to the housing of the electronic device (e.g., the housing 101 in FIG. 1) and/or the front cover 102. For example, the housing 101 may include the first support protrusion 111a and the second support protrusion 111b in FIG. 8 to fix both end portions of the elastic body 635. Both end portions of the elastic body 635 may be fixed between the first support protrusion 111a and the second support protrusion 111b and the inner face of the front cover 102 or to the inside of the rear cover 104.

In step 305, the magnets 631 are spaced apart from the inner face of the front cover 102. The elastic body 635 may be adapted to change its shape or position according to a change in magnetic force of the magnets 631. For example, when no magnetic force acts on the magnets 631, the elastic body 635 may cause the magnets 631 to be spaced apart from the inner face of the front cover 102.

Figure 16:
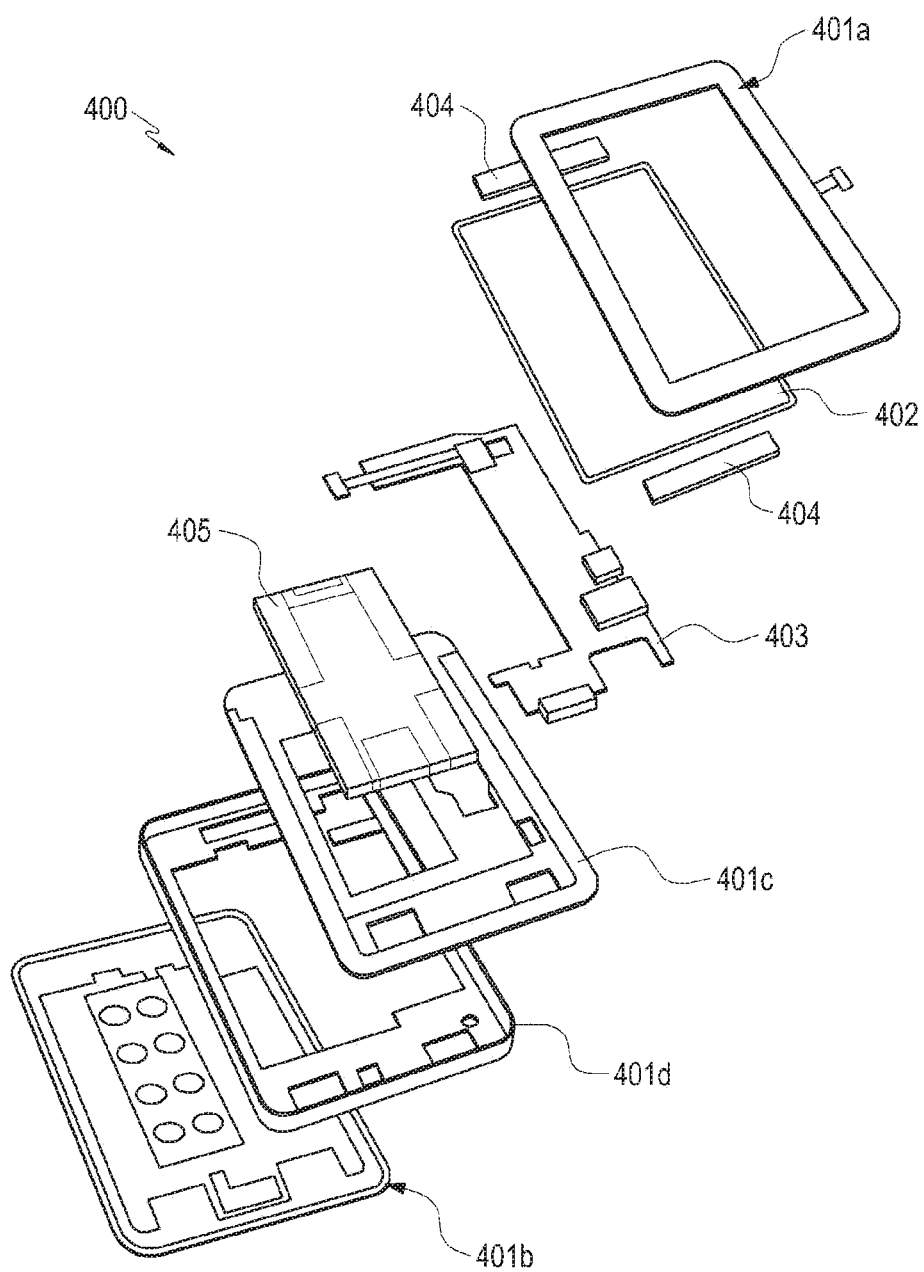
FIG. 16 is an exploded perspective view illustrating an electronic device according to an embodiment of the present disclosure.

FIG. 16 is an exploded perspective view illustrating an electronic device according to an embodiment of the present disclosure.

Referring to FIG. 16, the electronic device 400 may include all or a portion of the electronic device 100 described above. The electronic device 400 includes a housing, a display 402, a circuit board 403, a magnetic module 404, and a battery 405.

The housing includes a front cover 401a and a rear cover 401b, and at least one bracket 401c or 401d interposed between the front cover 401a and the rear cover 401b or accommodated between the front cover 401a and the 40 lb. For example, the bracket 401c or 401d may divide the internal space of the housing, or may provide an electromagnetic shield structure between electronic components accommodated in the housing.

The bracket 401c or 401d may reinforce the rigidity of the electronic device 400 and/or the housing. The front cover 401a includes a window that provides a screen area. The front cover 401a may be provided with a touch panel, and may acquire a touch input by being combined with the display 402 that is disposed to correspond to the screen area.

The circuit board 403 may include various electronic circuit components, such as an application processor, a communication module, and an audio module, that are mounted thereon. Although not denoted by reference numerals, various electronic circuit components, such as an antenna module, a camera module, a speaker module, a light emission element, etc., may be provided and accommodated in the inside of the housing together with the circuit board 403. Configurations of circuit devices or the like that are mounted on the circuit board and/or provided in the housing will be described in more detail with reference to FIG. 18. A plurality of circuit boards may be accommodated in the housing.

The magnetic module 404, for example, configured like the magnetic module 103 or 603, may be disposed in a region that is different from the region where the display 402 is provided within the housing. For example, the magnetic module 404 may be disposed in at least a portion of the housing and/or the edge region of the front cover 401a.

As described above, the magnetic module 404 may include a magnet and an elastic body, and the shape and/or position of at least a portion of the elastic body may be changed in response to the change of a magnetic force in relation to the magnet. For example, when no magnetic force reaches the magnet, the elastic body may maintain the magnet at a position spaced apart from the front cover 401a. When the magnet is positioned adjacent to another magnet, the magnet may move in a direction where an attractive force or a repulsive force acts, and the shape or position of the elastic body may be changed to correspond to the movement of the magnet.

The battery 405 provides power required for operating the electronic device 400 The electronic device 400 may have a battery-replaceable structure that allows the user to directly attach/detach the battery 405, or the electronic device 400 may have a battery-embedded structure in which the battery is accommodated within the housing such that the user cannot directly attach/detach the battery.

Figure 17:
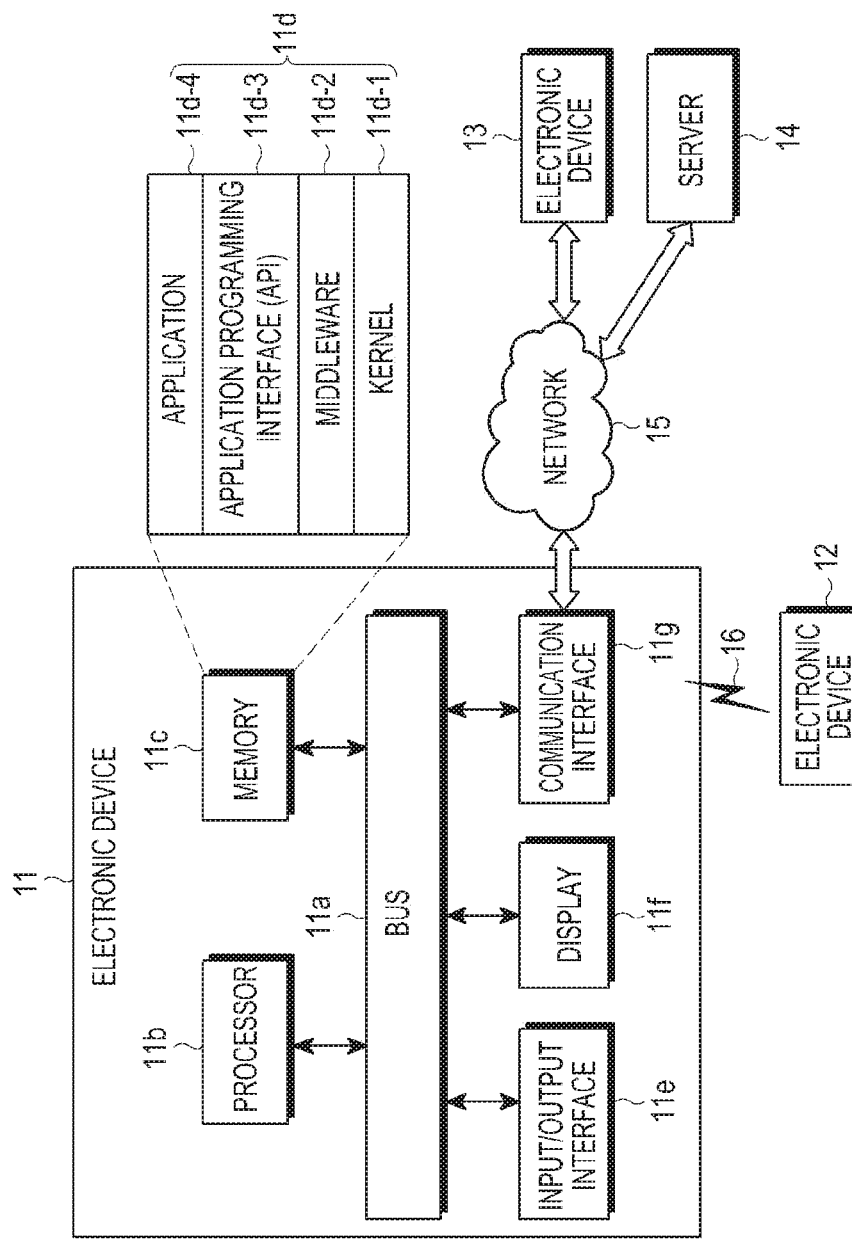
FIG. 17 illustrates a network environment including an electronic device according to an embodiment of the present disclosure.

FIG. 17 illustrates a network environment including an electronic device according to an embodiment of the present disclosure.

Referring to FIG. 17, the electronic device 11 includes a bus 11a, a processor 11b, a memory 11c, an input/output interface 11e, a display 11f, and a communication interface 11g. For example, the electronic device 11 may be constructed like the electronic device 100 of FIG. 1 and/or the electronic device 400 of FIG. 16. The electronic device 11 may omit at least one of the above-mentioned components or may additionally include other components.

The bus 11a may include a circuit that connects the above-mentioned components 11a to 11g and delivers communication (e.g., a control message and/or data) between the components. The processor 11b may include one or more of a central processing unit, an application processor, and a Communication Processor (CP). The processor 11b may execute an arithmetic operation or data processing that is related to a control and/or communication of one or more other components of the electronic device 11.

The memory 11c may include a volatile memory and/or a non-volatile memory. The memory 11c may store commands or data that are related to one or more other components of the electronic device 11. The memory 11c stores software and/or a program 11d. The program 11d includes a kernel 11d-1, a middleware 11d-2, an application programming interface (API) 11d-3, and an application program (or an "application") 11d-4. At least one of the kernel 11d-1, the middleware 11d-2, and the API 11d-3 may be referred to as an Operating System (OS). The kernel 11d-1 may control or manage system resources (e.g., the bus 11a, the processor 11b, or the memory 11c) that are used for executing operations or functions implemented in the other programs (e.g., the middleware 11d-2, the API 11d-3, or the application programs 11d-4). In addition, the kernel 11d-1 may provide an interface that allows the middleware 11d-2, the API 11d-3, or the application program 11d-4 to access individual components of the electronic device 11 in order to control or manage the system resources.

The middleware 11d-2 may play an intermediary role such that the API 11d-3 or the application programs 11d-4 may communicate with the kernel 11d-1 to exchange data. In addition, the middleware 11d-2 may process one or more task requests according to priority. For example, the middleware 11d-2 may assign the priority to be capable of using a system resource of the electronic device 11 (e.g., the bus 11a, the processor 11b, or the memory 11c) to at least one of the application programs 11d-4, and may process the one or more task requests.

The API 11d-3 allows the application 11d-4 to control functions provided from the kernel 11d-1 or the middleware 11d-2, and may include one or more interfaces or functions (e.g., commands) for a file control, a window control, an image processing, or a character control.

The input/output interface 11e may deliver commands or data, which are entered from a user or another external device, to the other component(s) of the electronic device 11, or may output commands or data, which are received from the other component(s) of the electronic device 11, to the user or the other external device.

The display device 11f may include a liquid crystal display (LCD), a light emitting diode (LED) display, an organic LED (OLED) display, a microelectromechanical System (MEMS), or an electronic paper display. The display 11f may display various contents (e.g., text, image, video, icon, and/or symbol) to the user. The display 11f may include a touch screen, and may receive a touch input, a gesture input, a proximity input, or a hovering input that is made using, for example, an electronic pen or a part of the user's body.

The communication interface 11g may set communication between the electronic device 11 and a first external electronic device 12, a second external device 13, and/or a server 14. For example, the communication interface 11g may communicate with the second external electronic device 13 or the server 14 by being connected with a network 15 through wired or wireless communication. For example, the first external electronic device 12 or the second external device 13 may be a Bluetooth keyboard.

The wireless communication may include a cellular communication that uses at least one of long-term evolution (LTE), LTE advance (LTE-A), code division multiple access (CDMA), wideband CDMA (WCDMA), universal mobile telecommunication system (UMTS), wireless broadband (WiBro), and global system for mobile communication (GSM). The wireless communication may include at least one of WiFi, Bluetooth, Bluetooth Low Energy (BLE), ZigBee, near field communication (NFC), magnetic secure transmission, radio frequency (RF), and body area network (BAN).

The wireless communication may also include global navigation satellite system (GNSS), for example, at least one of global positioning system (GPS), global navigation satellite system (Glonass), Beidou navigation satellite system (hereinafter, "Beidou"), Galileo, and the European global satellite-based navigation system.

The wired communication may use at least one of universal serial bus (USB), high definition multimedia interface (HDMI), recommended standard 232 (RS-232), and plain old telephone service (POTS).

The network 15 may include a telecommunication network (e.g., at least one of a computer network (e.g., LAN or WAN), the internet, and a telephone network).

Each of the first and second external electronic devices 12 and 13 may be a type of device that is the same as, or different from, the electronic device 11. All or some of the operations to be executed by the electronic device 11 may be executed by another electronic device or a plurality of other electronic devices (e.g., the electronic devices 12 and 13 or the server 14). For example, when the electronic device 11 should perform a certain function or service, automatically or in response to a request, the electronic device 11 may request some functions or services that are associated therewith from the electronic devices 12 and 13 or the server 14, instead of, or in addition to, executing the functions or service by itself. The electronic devices 12 and 13 and/or the server 14 may execute the requested functions or additional functions, and may deliver the results to the electronic device 11. The electronic device 11 may provide the requested functions or services by processing the received results as they are or additionally. For this purpose, for example, a cloud computing technique, a distributed computing technique, or a client-server computing technique may be used.

Figure 18:
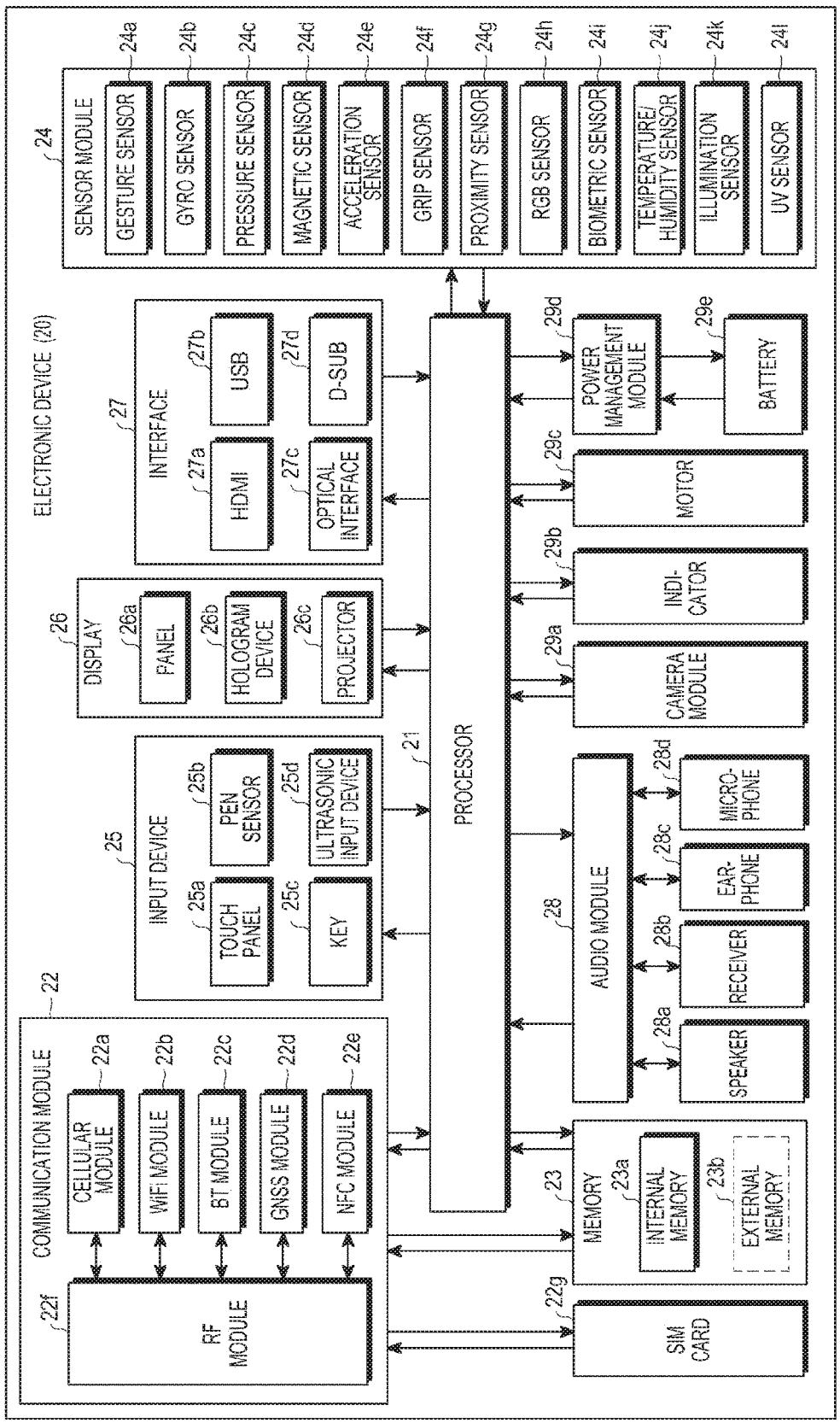
FIG. 18 illustrates an electronic device according to an embodiment of the present disclosure.

FIG. 18 illustrates an electronic device according to an embodiment of the present disclosure.

Referring to FIG. 18, the electronic device 20 includes a processor (e.g., an AP) 21, a communication module 22, a subscriber identification module 22g, a memory 23, a sensor module 24, an input device 25, a display 26, an interface 27, an audio module 28, a camera module 29a, a power management module 29d, a battery 29e, an indicator 29b, and a motor 29c. The processor 21 may drive an OS or an application program to control a plurality of hardware or software components connected thereto, and may also perform various data processing and arithmetic operations. The processor 21 may be implemented by a System-on-Chip (SoC). The processor 21 may further include a Graphic Processing Unit (GPU) and/or an image signal processor.

The processor 21 may include at least some other components illustrated in FIG. 18 (e.g., the cellular module 22a). The processor 21 may load commands or data received from at least one of the other components (e.g., a non-volatile memory) in a volatile memory to process the command and data, and may store result data in a non-volatile memory.

The communication module 22 includes a cellular module 22a, a WiFi module 22b, a Bluetooth module 22c, a GNSS module 22d, an NFC module 22e, and an RF module 22f. The cellular module 22a may provide a voice call, a video call, a message service, or an internet service through, for example, a communication network. The cellular module 22a may perform discrimination and authentication of the electronic device 20 within the communication network by using a subscriber identification module (SIM) card 22g. The cellular module 22a may perform at least some of the functions that may be provided by the processor 21. The cellular module 22a may include a Communication Processor (CP).

At least two of the cellular module 22a, the WiFi module 22b, the Bluetooth module 22c, the GNSS module 22d, and the NFC module 22e may be incorporated in a single Integrated Chip (IC) or an IC package.

The RF module 22f may transmit/receive a communication signal (e.g., an RF signal). The RF module 22f may include a transceiver, a power amp module (PAM), a frequency filter, a low noise amplifier (LNA), and/or an antenna. At least one of the cellular module 22a, the WiFi module 22b, the Bluetooth module 22c, the GPS module 22d, and the NFC module 22e may transmit/receive an RF signal through one or more separate RF modules.

The SIM card 22g may be an embedded SIM, and may also include intrinsic identification information (e.g., Integrated Circuit Card IDentifier (ICCID)) or subscriber information (e.g., International Mobile Subscriber Identity (IMSI)).

The memory 23 includes an internal memory 23a and an external memory 23b. The internal memory 23a may include at least one of a volatile memory (e.g., a DRAM, an SRAM, or an SDRAM), a non-volatile memory (e.g., a programmable read only memory (PROM), a one-time PROM (OTPROM), an erasable PROM (EPROM), an electrically EPROM (EEPROM), a mask ROM, a flash ROM, a flash memory, a hard drive, and a solid state drive (SSD).

The external memory 23b may include a flash drive (e.g., a compact flash (CF), a secure digital (SD), a micro SD (Micro-SD), a mini SD (Mini-SD), an extreme digital (xD), a multi-media card (MMC), or a memory stick). The external memory 23b may be functionally or physically connected to the electronic device 20 through various interfaces.

The sensor module 24 may measure a physical quantity or may sense an operating status of the electronic device 20, and may then convert the measured or sensed information into electric signals. The sensor module 24 includes a gesture sensor 24a, a gyro sensor 24b, an atmospheric pressure sensor 24c, a magnetic sensor 24d, an acceleration sensor 24e, a grip sensor 24f, a proximity sensor 24g, a color sensor 24h (e.g., a red, green, blue (RGB) sensor), a biometric sensor 24i, a temperature/humidity sensor 24j, an illuminance sensor 24k, and a ultra-violet (UV) sensor 24l. Additionally or alternatively, the sensor module 24 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 24 may further include a control circuit for controlling one or more sensors incorporated therein. The electronic device 20 may further include a processor configured to control the sensor module 24 as a part of the processor 21 or separate from the processor 21 in order to control the sensor module 24, e.g., while the processor 21 is in the sleep state.

The input device 25 includes a touch panel 25*a*, a (digital) pen sensor 25*b*, a key 25*c*, and an ultrasonic input device 25*d*. As the touch panel 25*a*, at least one of a capacitive type touch panel, a resistive type touch panel, an infrared type touch panel, and an ultrasonic type panel may be used. In addition, the touch panel 25*a* may further include a control circuit. The touch panel 25*a* may further include a tactile layer for providing a tactile reaction to a user.

The (digital) pen sensor 25*b* may be a portion of the touch panel, or may include a separate recognition sheet.

The key 25*c* may include a physical button, an optical key, and/or a keypad.

The ultrasonic input device 25*d* may sense, through a microphone 28*d*, ultrasonic waves that are generated by an input tool to confirm data corresponding to the sensed ultrasonic waves.

The display 26 includes a panel 26*a*, a hologram device 26*b*, a projector 26*c*, and/or a control circuit for controlling these components.

The panel 26*a* may be implemented to be, for example, flexible, transparent, or wearable. The panel 26*a* may be constituted with the touch panel 25*a* and one or more modules. The panel 26*a* may include a pressure sensor (or a force sensor) that is capable of measuring the intensity of a pressure for a user's touch. The pressure sensor may be integrally implemented with the touch panel 25*a*, or implemented by one or more sensors separately from the touch panel 25*a*.

The hologram device 26*b* may show a stereoscopic image in the air using interference of light.

The projector 26*c* may project light onto a screen so as to display an image. The screen may be located inside or outside the electronic device 20.

The interface 27 includes an HDMI 27*a*, a USB 27*b*, an optical interface 27*c*, and a D-subminiature (D-sub) 27*d*. Additionally or alternatively, the interface 27 may include a mobile high-definition link (MHL) interface, an SD card/MMC interface, or an infrared data association (IrDA) standard interface.

The audio module 28 may bi-directionally convert, sound and electric signals. The audio module 28 may process sound information input or output through a speaker 28*a*, a receiver 28*b*, an earphone 28*c*, and/or the microphone 28*d*.

The camera module 29*a* is capable of photographing a still image and/or a video image, and may include at least one image sensor (e.g., a front sensor or a rear sensor), a lens, an image signal processor (ISP), or a flash (e.g., LED or xenon lamp).

The power management module 29*d* may manage the electric power of the electronic device 20. The power management module 29*d* may include a power management integrated circuit (PMIC), a charger integrated circuit (IC), and/or a battery gauge.

The PMIC may be configured in a wired and/or wireless charge type. The wireless charge type may include a magnetic resonance type, a magnetic induction type, or an electromagnetic wave type, and may further include an additional circuit for wireless charging (e.g., a coil loop, a resonance circuit, or a rectifier).

The battery gauge may measure the residual capacity of the battery 29*e*, and a voltage, a current, or a temperature during the charge.

The battery 29*e* may include a rechargeable battery and/or a solar battery.

The indicator 29*b* may indicate a specific status of the electronic device 20 or of a part thereof (e.g., the processor 21), such as a booting status, a message status, or a charged status.

The motor 29*c* may convert an electric signal into a mechanical vibration, and may generate a vibration or a haptic effect.

The electronic device 20 may also include a mobile TV support device (e.g., a GPU) that is capable of processing media data according to a standard, e.g., digital multimedia broadcasting (DMB), digital video broadcasting (DVB), or MediaFlo™.

Each of the components described herein may be constituted with one or more components, and the names of the corresponding components may vary depending on a type of an electronic device. In accordance with the above-described embodiments, an electronic device (e.g., the electronic device 20) may omit some of the components, or may include an additional component. Further, some of the components are combined with each other to be configured as one object and to perform the functions of the corresponding components prior to the combination.

As described above, an electronic device according to various embodiments of the present disclosure is a wearable electronic device that may include: a housing; a magnet positioned within the housing; and an elastic body connected to the magnet. At least a portion of the elastic body may be adapted to change a shape or a position thereof in response to a change of a magnetic force with respect to the magnet.

According to various embodiments, at least a portion of the elastic body may be adapted to move from a first position corresponding to a first face of the housing to a second position corresponding to a second face of the housing in response to a change of a magnetic force with respect to the magnet.

According to various embodiments, the portable electronic device may further include a display positioned in a first region of the housing, and the magnet may be positioned in a second region of the housing.

According to various embodiments, the second region may be at least a portion of an edge region of the housing.

According to various embodiments, the elastic body may include, on one face thereof, a holder that accommodates the magnet.

According to various embodiments, the elastic body may cause the magnet to be spaced apart from the one face of the housing in response to the change of the magnetic force.

According to various embodiments, the holder may be formed of a material that is different from that of the elastic body.

According to various embodiments, the housing may include support protrusions that fix both end portions of the elastic body.

According to various embodiments, the magnet may include a first magnet corresponding to a first polarity and a second magnet corresponding to a second polarity.

According to various embodiments, the first magnet and the second magnet are spaced apart from each other by a predetermined distance.

According to various embodiments, the magnet may include a first magnet and a second magnet corresponding to a same polarity.

According to various embodiments, the first magnet and the second magnet are spaced apart from each other by a predetermined distance.

According to various embodiments, the magnet may be adapted to change the position thereof based on an elastic force of the elastic body.

According to various embodiments, the change of the magnetic force may be caused by the external electronic device that includes another magnet.

According to various embodiments of the present disclosure, a portable electronic device may include: a housing; a magnet positioned within the housing; and an elastic body connected to the magnet. At least a portion of the elastic body may be adapted to move from a first position corresponding to a first face of the housing to a second position corresponding to a second face of the housing in response to a change of a magnetic force with respect to the magnet.

According to various embodiments, the magnet may be adapted to move from the second position to the first position based on the elastic force of the elastic body.

According to various embodiments, the portable electronic device may further include an input/output device that includes a second magnet, and is attachable to/detachable from the housing at least based on a magnetic force of the magnet and the second magnet.

According to various embodiments, the input/output device may further include a second elastic body coupled to the second elastic body.

According to various embodiments, the input/output device may include a display, a keyboard, a speaker, a touch pad, or a combination thereof.

In addition, according to various embodiments of the present disclosure, a portable electronic device may include: a housing; a magnet positioned within the housing; and an elastic body connected to the magnet. At least a portion of the elastic body may be set to respond to a change of a magnetic force with respect to the magnet so as to be spaced apart from one face of the housing.

While the present disclosure has been shown and described with reference to certain embodiments thereof, it will be understood by those skilled in the art that various changes in form and detail may be made therein without departing from the spirit and scope of the present disclosure as defined by the appended claims and any equivalents thereof.

For example, the electronic device and the external device have been described above as separate structures, but is not limited thereto. For example, an electronic device may include a main body that is formed as the above-described electronic device, and a sub-body that is formed as the above-described external device.

While the above-described embodiments of the present disclosure have disclosed an example in which an elastic body, which is equipped with a plurality of magnets, is mounted on the front cover, the elastic body may be fixed to the housing itself within the electronic device. For example, a structure may be formed within the housing to fasten and fix the elastic part of the elastic body.

For example, the magnets may be disposed at various positions around the screen area, which may be properly designed in consideration of the shapes and appearances of the electronic device and the external device.

While the above-described embodiments of the present disclosure have disclosed an example in which the elastic parts of the elastic body extend from the magnet fixing part to be inclined, the present disclosure is not limited thereto. For example, when the magnet fixing part may be movable on the front cover and/or within the housing, the elastic parts may extend from the fixing part in the vertical direction.

What is claimed is:
1. A portable electronic device comprising:
   a housing;
   a magnet device positioned within the housing;
   an elastic body including a fixing part and elastic parts formed at opposite ends of the fixing part, the elastic parts being formed to be inclined with respect to the fixing part and to provide an elastic force to the fixing part, wherein both ends of the elastic body are fixed to an inner face of the housing;
   a holder mounted to the fixing part and fixing the magnet device to the elastic body,
   wherein the magnet device is mounted on the fixing part of the elastic body while being fixed to the holder,
   wherein the elastic force provided by the elastic parts acts in a direction of causing the fixing part to be spaced apart from the inner face of the housing, and
   wherein at least a portion of the elastic body changes a shape or a position thereof and the fixing part comes in contact with the inner face of the housing, in response to a change of a magnetic force of the magnet device.

2. The portable electronic device of claim 1, wherein the fixing part and the fixing part moves from a first position corresponding to a first face of the housing to a second position corresponding to a second face of the housing, in response to the change of the magnetic force.

3. The portable electronic device of claim 1, further comprising a display.

4. The portable electronic device of claim 3, wherein the magnet device is disposed at an edge region of the housing.

5. The portable electronic device of claim 1, wherein the holder is configured to accommodate the magnet device.

6. The portable electronic device of claim 5, wherein the holder is formed of a material that is different from that of the elastic body.

7. The portable electronic device of claim 1, wherein the elastic body spaces the magnet device apart from a face of the housing, in response to the change of the magnetic force.

8. The portable electronic device of claim 1, wherein the housing comprises support protrusions that receive end portions of the elastic body.

9. The portable electronic device of claim 1, wherein the magnet device comprises a first magnet corresponding to a first polarity and a second magnet corresponding to a second polarity.

10. The portable electronic device of claim 9, wherein the first magnet and the second magnet are spaced apart from each other by a predetermined distance.

11. The portable electronic device of claim 1, wherein the magnet device comprises a first magnet and a second magnet corresponding to a same polarity.

12. The portable electronic device of claim 11, wherein the first magnet and the second magnet are spaced apart from each other by a predetermined distance.

13. The portable electronic device of claim 1, wherein the magnet device changes the position thereof, based on an elastic force of the elastic body.

14. The portable electronic device of claim 1, wherein the change of the magnetic force is caused by another magnet included in an external device.

15. A portable electronic device comprising:
    a housing;
    a first magnet positioned within the housing;
    an elastic body including a fixing part and elastic parts formed at opposite ends of the fixing part, the elastic parts being formed to be inclined with respect to the fixing part and to provide an elastic force to the fixing part, wherein both ends of the elastic body are fixed to an inner face of the housing; and a holder mounted to the fixing part and fixing the first magnet to the elastic body, wherein the first magnet is mounted on the fixing part of the elastic body while being fixed to the holder, wherein the elastic force provided by the elastic parts acts in a direction of causing the fixing part to be spaced apart from the inner face of the housing, and wherein at least the fixing part of the elastic body is moveable between a first position spaced apart from the inner face of the housing and a second position and comes in contact with the inner face of the housing, in response to a change of a magnetic force of the first magnet.

16. The portable electronic device of claim 15, wherein the first magnet moves from the second position to the first position, based on the elastic force of the elastic body.

17. The portable electronic device of claim 15, further comprising an input/output device that comprises a second magnet, wherein the input/output device is attachable to and detachable from the housing based on the magnetic force of the first magnet and the second magnet.

18. The portable electronic device of claim 17, wherein the input/output device further comprises a second elastic body coupled to the second magnet.

19. The portable electronic device of claim 17, wherein the input/output device further comprises at least one of a display, a keyboard, a speaker, and a touch pad.

20. A portable electronic device comprising:

a housing;

a magnet positioned within the housing;

an elastic body including a fixing part and elastic parts formed at opposite ends of the fixing part, the elastic parts being formed to be inclined with respect to the fixing part and to provide an elastic force to the fixing part, wherein both ends of the elastic body are fixed to an inner face of the housing; and a holder mounted to the fixing part and fixing the magnet to the elastic body, wherein the magnet is mounted on the fixing part of the elastic body while being fixed to the holder, wherein at least the fixing part of the elastic body is spaced apart from the inner face of the housing by the elastic force of the elastic parts, and wherein at least the fixing part of the elastic body comes in contact with the inner face of the housing in response to a change of a magnetic force of the magnet.

* * * * *